(12) United States Patent
Barker et al.

(10) Patent No.: US 6,678,447 B1
(45) Date of Patent: Jan. 13, 2004

(54) ADJUSTABLE MULTI-BEAM SPLITTER AND FIBER COUPLER

(75) Inventors: Lynn M. Barker, Albuquerque, NM (US); Zane B. Barker, Albuquerque, NM (US)

(73) Assignee: Valyn International, Albuquerque, NM (US)

( * ) Notice: Subject to any disclaimer, the term of this patent is extended or adjusted under 35 U.S.C. 154(b) by 72 days.

(21) Appl. No.: 09/898,933

(22) Filed: Jul. 3, 2001

(51) Int. Cl.[7] .............................. G02B 6/26; G02B 27/10

(52) U.S. Cl. ........................ 385/47; 385/31; 359/618; 359/629

(58) Field of Search ............................ 385/31, 33, 36, 385/47, 147, 134, 135; 359/618, 629–634, 636, 156; 356/487, 491

(56) References Cited

U.S. PATENT DOCUMENTS

| | | | | |
|---|---|---|---|---|
| 4,859,029 A | * | 8/1989 | Durell | 359/629 |
| 5,274,436 A | * | 12/1993 | Chaney | 356/487 |
| 5,798,867 A | * | 8/1998 | Uchida et al. | 359/629 |
| 5,852,507 A | * | 12/1998 | Hall | 359/156 |
| 6,084,717 A | * | 7/2000 | Wood et al. | 359/629 |

* cited by examiner

*Primary Examiner*—Georgia Epps
*Assistant Examiner*—Juliana K. Kang

(57) ABSTRACT

An adjustable laser light beamsplitter and fiber optic coupler apparatus and method comprising a plurality of splitter modules placeable into an optical path, each module comprising: a splitter to split off a selectable portion of an incident polarized laser beam; a fiber coupler to capture the split-off portion into an optical fiber; and a beam transmitter element to transmit a remainder of the incident beam to serve as an incident polarized laser beam for any subsequent splitter module.

28 Claims, 9 Drawing Sheets

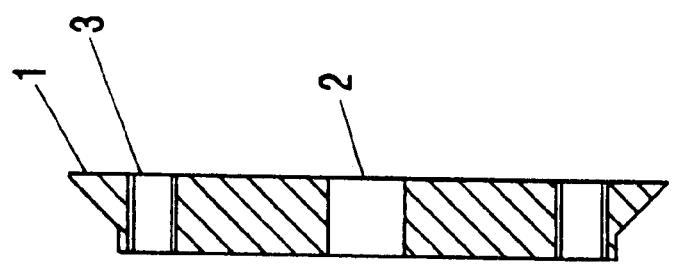
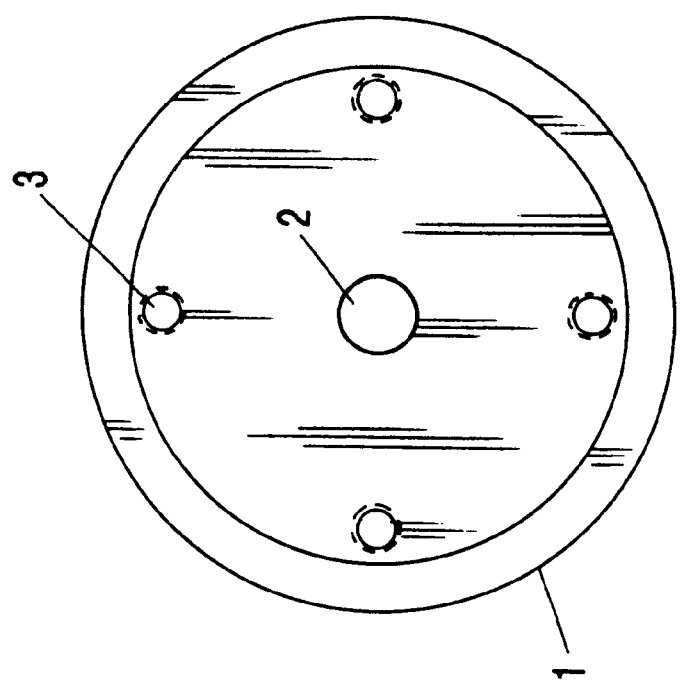

ADJUSTABLE MULTI-BEAM SPLITTER AND FIBER COUPLER

BACKGROUND OF THE INVENTION

Field of the Invention (Technical Field)

The present invention relates to beam splitters for optics applications.

SUMMARY OF THE INVENTION (DISCLOSURE OF THE INVENTION)

The present invention is of an adjustable laser light beamsplitter and fiber optic coupler apparatus comprising a plurality of splitter modules placeable into an optical path, each module comprising: a splitter to split off a selectable portion of an incident polarized laser beam; a fiber coupler to capture the split-off portion into an optical fiber; and a beam transmitter element to transmit a remainder of the incident beam to serve as an incident polarized laser beam for any subsequent splitter module. In the preferred embodiment, the splitter modules are fungible. The splitter is preferably a polarizing beamsplitter (most preferably a dichroic cube polarizing beamsplitter) which can rotate about the axis of the incident beam, thereby providing adjustability of the selectable portion of the incident laser beam via rotational orientation of the beamsplitter with respect to polarization of the incident laser beam. The fiber coupler preferably comprises a light beam focusing element for focusing the split-off portion to a point of focus and optical fiber positioning elements providing X, Y, and Z adjustability of the optical fiber end to substantially coincide with the point of focus. An element is provided for securing the light beam focusing means to the polarizing beamsplitter. Each of the splitter modules preferably comprises a disk housing the splitter, fiber coupler, and beam transmission means, with the splitter directing the split-off portion in a direction perpendicular to the incident laser beam. A support is preferred to support the splitter modules in an alignment plane and centered on the optical path, but allowing for rotation of each of the splitter modules independently from rotation of adjacent splitter modules. Each splitter module comprises a coupler to couple to adjacent splitter modules. A laser light containment element (preferably a screw at the end of the optical path) prevents escape of laser light other than through optical fibers.

The invention is additionally of a laser light beamsplitting and fiber optic coupling method comprising: placing a plurality of splitter modules into an optical path; adjusting each module to divert a desired amount of an incident polarized laser beam; directing a polarized laser beam along the optical path; and allowing each module to: split off a selectable portion of an incident polarized laser beam; capture the split-off portion into an optical fiber; and transmit a remainder of the incident beam to serve as an incident polarized laser beam for any subsequent splitter module. In the preferred embodiment, the splitter modules are fungible. Split off occurs via a polarizing beamsplitter (most preferably a dichroic cube polarizing beamsplitter) rotatable about an axis of the incident beam, thereby providing adjustability of the selectable portion of the incident laser beam via rotational orientation of the beamsplitter with respect to polarization of the incident laser beam. Capture occurs via a fiber coupler comprising a light beam focusing element for focusing the split-off portion to a point of focus and optical fiber positioning elements providing X, Y, and Z adjustability of an optical fiber end to substantially coincide with the point of focus. The light beam focusing element is secured to the polarizing beamsplitter. Each of the splitter modules comprises a disk housing the splitter, fiber coupler, and beam transmission means. The split-off portion is directed in a direction perpendicular to the incident laser beam. The splitter modules are supported in an alignment plane and centered on the optical path, and rotation of each splitter module is independent from rotation of adjacent splitter modules. Each splitter module comprises a coupler to couple to adjacent splitter modules. A laser light containment element is employed to prevent escape of laser light other than through optical fibers.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention. In the drawings:

FIG. 1 is a front view of the LAser BAse TO Splitter Adapter (LABATOSA) dovetail of the invention;

FIG. 2 is a sectional view of the LABATOSA dovetail;

Figure 4:
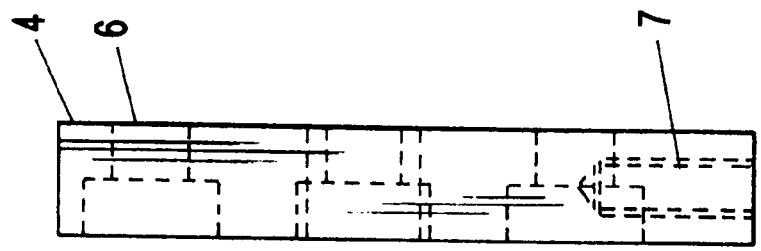
FIG. 4 is side view of the LABATOSA dovetail backing.
Figure 3:
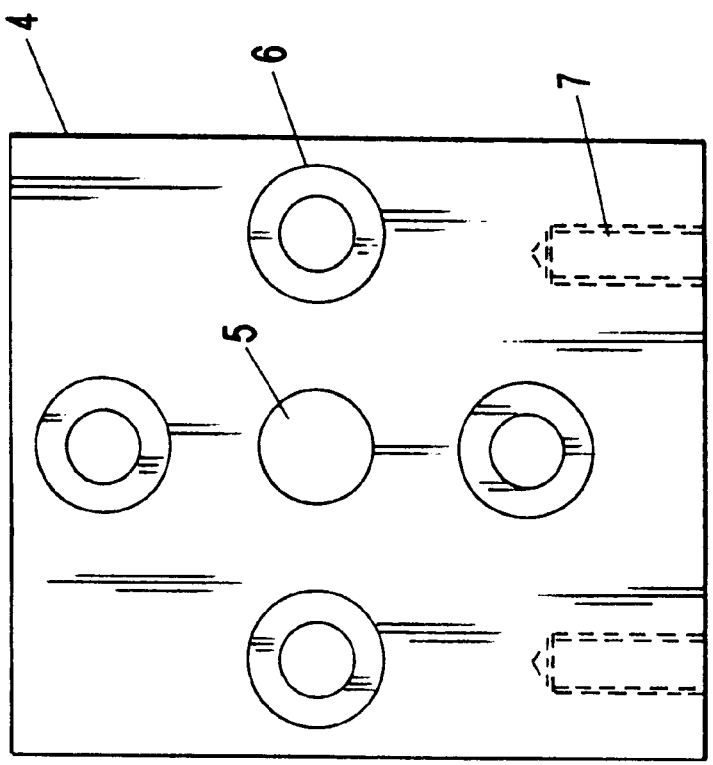
FIG. 3 is a front view of the LABATOSA dovetail backing.
Figure 6:
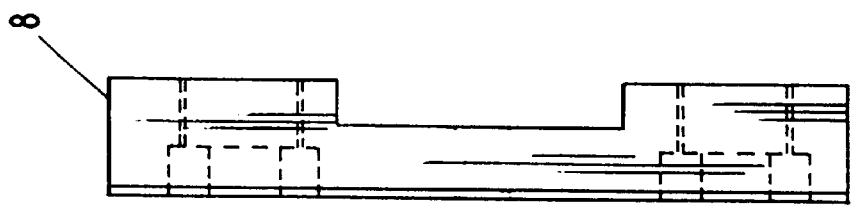
FIG. 6 is an end view of the LABATOSA base.
Figure 5:
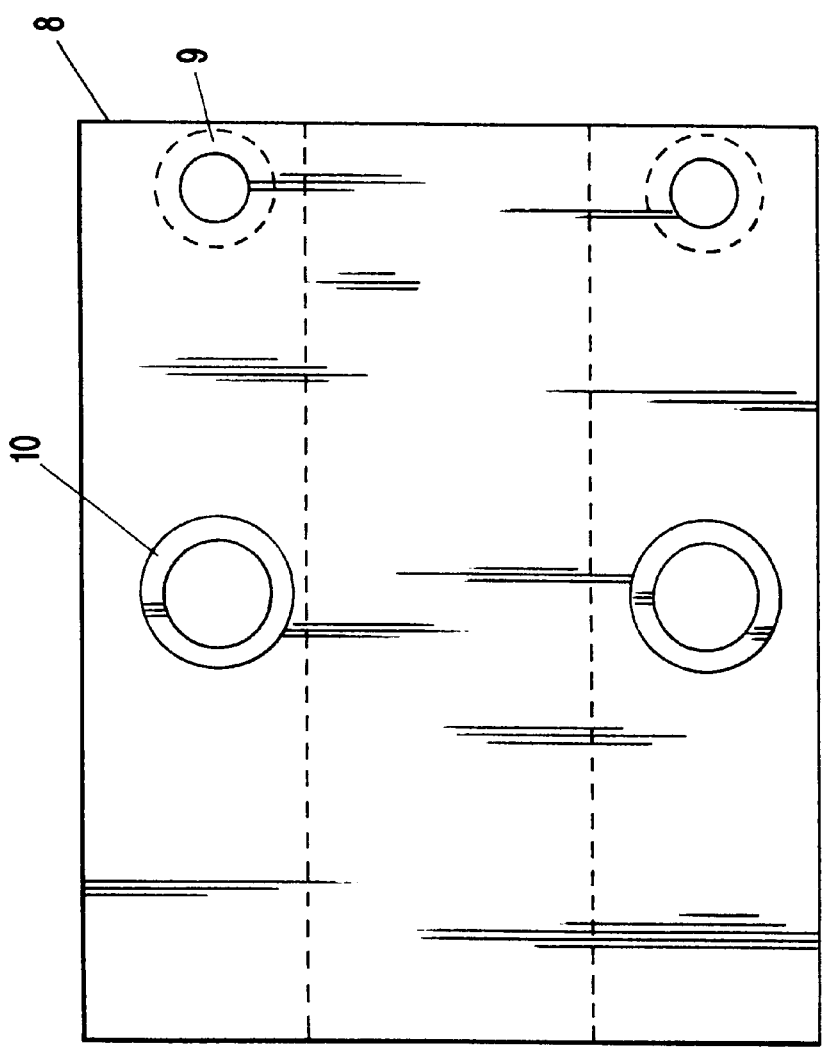
FIG. 5 is a top view of the LABATOSA base.

DESCRIPTION OF THE PREFERRED EMBODIMENTS (BEST MODES FOR CARRYING OUT THE INVENTION)

The present invention is of an Adjustable Multi-Beam Splitter and Fiber Coupler (AMBS/FC), which provides a solution to the problem of being able to variably and adjustably split a laser beam into several optical fibers for use in Velocity Interferometer System for Any Reflector (VISAR) systems and other optical instrumentation. Advantages of the present invention include: Modular construction allowing addition or deletion of splitter modules to attain the number of output beams desired. As more beams are needed, more modules can be added. The splitting ratio is easily and continuously variable for each output beam without wasting any light. Each splitter module not only splits off the desired amount of light, but also captures the split-off light into an optical fiber (preferably 50/125 µm), eliminating the need for a fiber optic laser coupler. The input power is preferably up to 10 W continuous. Throughput efficiency is preferably at least~80%.

Reference being made to the Figures, the reference numerals therein refer to the following invention elements:

1 LABATOSA dovetail
2 LABATOSA dovetail laser beam hole
3 LABATOSA dovetail anchoring threads
4 LABATOSA upright
5 Upright laser beam hole
6 upright dovetail anchoring holes
7 upright mounting threads
8 LABATOSA base
9 Base upright mounting holes
10 Base mounting holes
11 Fiber cable cap
12 Fiber jacket hole
13 Fiber hole
14 Spring pin clearance arc
15 Z pull screw hole
16 Z push screw hole
17 Splitter top hat
18 Top hat mounting hole
19 Spring clearance arch
20 X adjusting screw threads
21 Y adjusting screw threads
22 LAFE
23 LAFE Z pull screw threads
24 Spring pin hole
25 Fiber cable cap hole
26 Lens shelf
26A Lens hole
27 Splitter module
28 Splitter dovetail
29 Splitter dovetail interlocking screw threads
30 Splitter top hat mounting surface
31 Polarizing beamsplitter cavity
32 Polarizing beamsplitter supporting surface
33 Light-blocking screw threads
33A Module laser beam hole
34 Dovetail receiving cavity
35 Spring anchoring pin hole
36 Spring trough
37 LAFE-supporting cone
38 LAFE clearance hole
39 Top hat mounting threads
40 Nylon dovetail-engaging screw threads
41 AMBS/FC
42 Light-blocking screw
43 Spring
44 X & Y adjusting screws
45 Z pull screw
46 Z push screw
47 Nylon dovetail-engaging screw
48 Optical fiber (for clarity shown on only one of the splitter modules)

Figure 18:
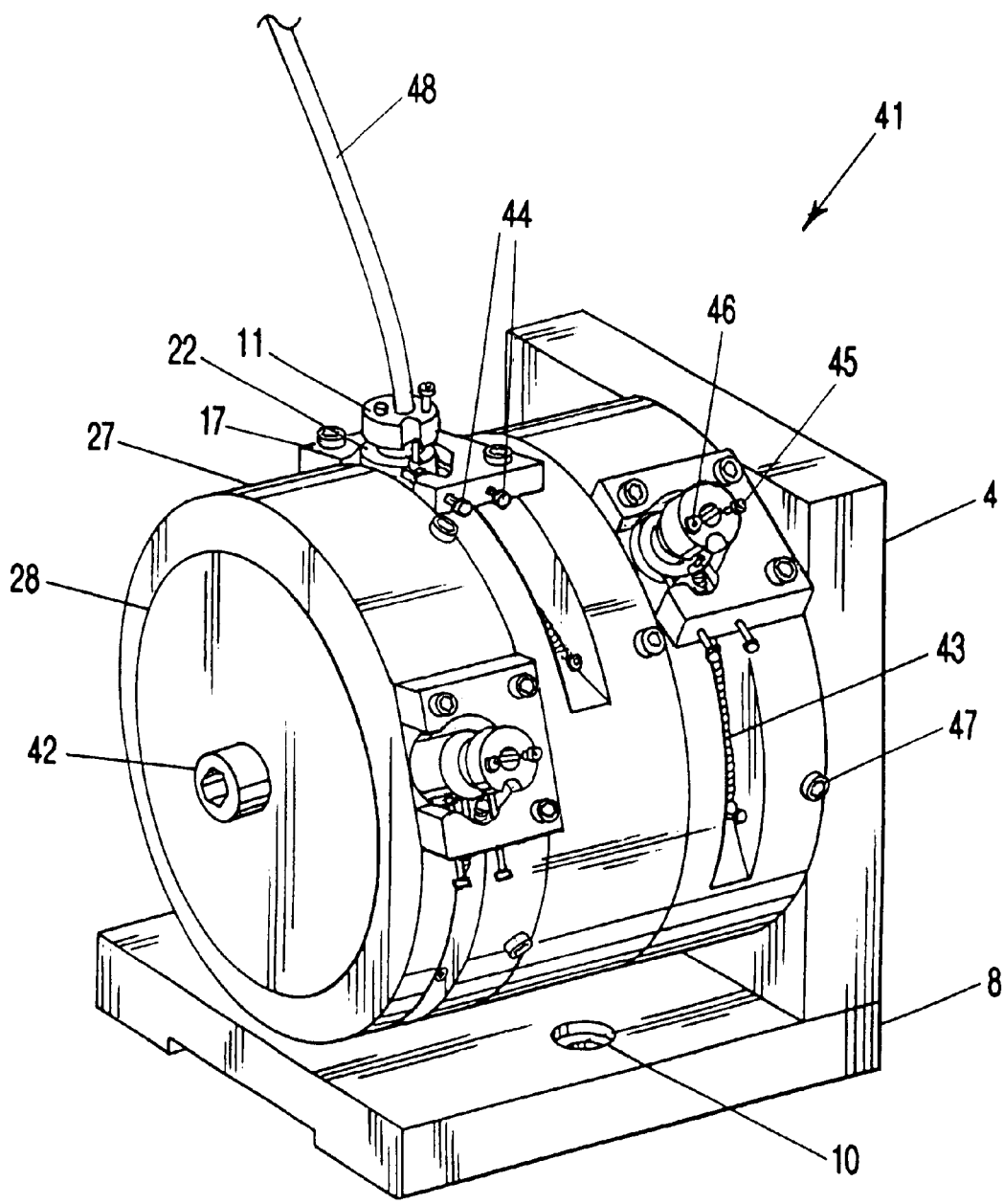
FIG. 18 is a perspective view of the Adjustable Multi-Beam Splitter and Fiber Coupler (AMBS/FC) of the invention comprising three splitter modules oriented for approximately even splitting of the incident laser light into three coupled fiber optic cables.

In the preferred embodiment, the AMBS 41 preferably comprises interlocking disks, or modules 27, each of which has an output optical fiber 48 carrying the light split off by the module (see FIG. 18). The input light is simply the polarized laser beam. Referring to FIGS. 14–17, each module comprises a polarizing beamsplitter (PBS) cube (not shown) fixed at its center in a polarizing beamsplitter cavity 31. The plane of the module is perpendicular to the laser beam, and the orientation of the PBS with respect to the polarization of the beam determines the amount of light split off at a right angle. To attain the desired split, the entire module is rotated about its axis. The light transmitted through the PBS remains polarized, of course, and serves as the input laser beam to the next splitter module. Although the modules are attached to each other via splitter dovetail 28, they can be, easily rotated with respect to one another. Thus, the user has complete control of the amount of light split off by each module. Each module additionally comprises dovetail interlocking screw threads 29, top hat mounting surface 30, polarizing beamsplitter supporting surface 32, light-blocking screw threads 33 (for light-blocking screw 42), module laser beam hole 33A, dovetail receiving cavity 34, spring anchoring pin hole 35, spring trough 36, LAFE-supporting cone 37, LAFE clearance hole 38, top hat mounting threads 39, and nylon dovetail-engaging screw threads 40.

Each module also contains a focusing lens (not shown) in lens hole 26A and an XYZ positioning system (screws 44,45,46, holes and threads 15,16,20,21,23) for locating its output optical fiber to capture the split-off light. This is the Fiber Coupler aspect of the Adjustable Multi-Beam Splitter and Fiber Coupler. While the complete abbreviation of the invention is AMBS/FC, AMBS is used for brevity, with the Fiber Coupler property being implicitly included.

Referring to FIGS. 1–6, the AMBS mount, referred to as a LABATOSA, for LAser BAse TO Splitter Adapter, is furnished to hold the first splitter module in place just in front of the laser. The Splitter Module preferably has two nylon screws 47 which engage a circular dovetail feature 1 on the LABATOSA, thus allowing the module to be rotated around the laser beam axis while attached to the mount. Each splitter module also has its own dovetail 28 to which a subsequent module can be attached, until as many modules are added as desired. The LABATOSA further comprises dovetail laser beam hole 2, dovetail anchoring threads 3, upright 4, upright laser beam hole 5, upright dovetail anchoring holes 6, upright mounting threads 7, base 8, base upright mounting holes 9, and base mounting holes 10.

As mentioned above, a polarizing beamsplitter cube is held in the center of each module. A radial hole 37,38 is positioned in the module where the split-off beam is reflected. The hole, its surroundings and contents provide a mechanism for focusing the split-off beam to a point, and for positioning a fiber end at the focal point to pick up the light.

Figure 8:
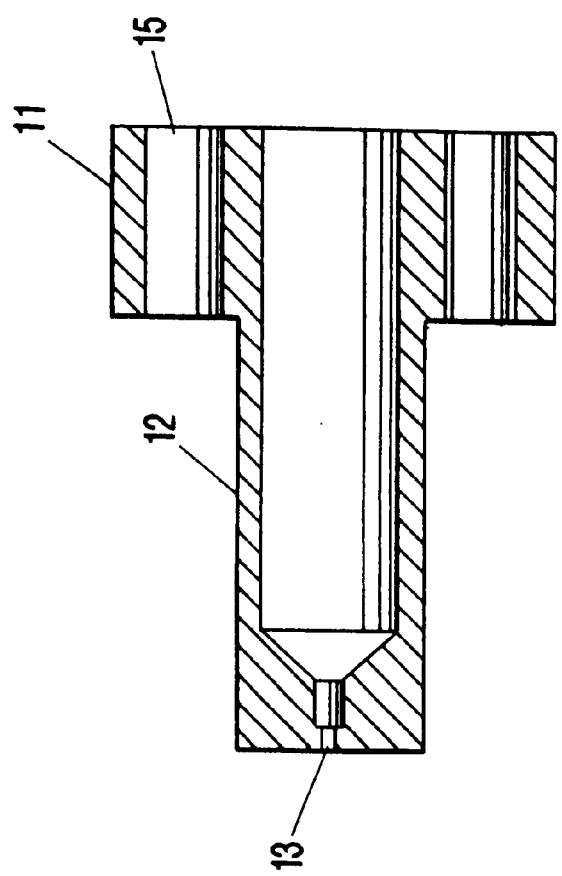
FIG. 8 is a sectional view of the fiber cable cap.
Figure 7:
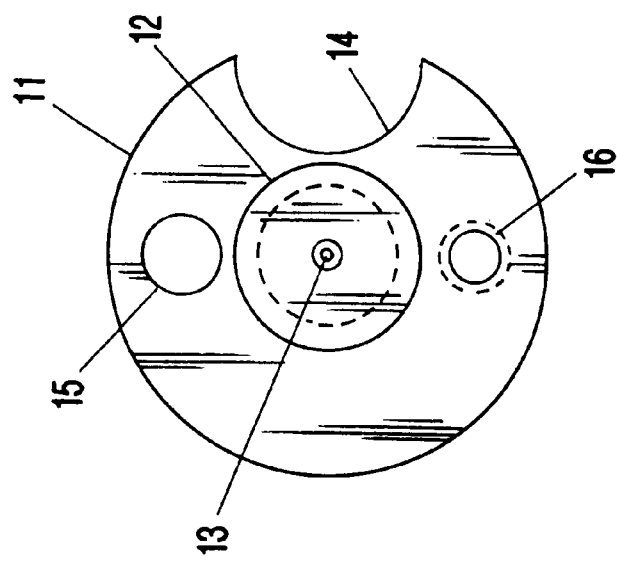
FIG. 7 is a top view of a fiber cable cap.
Figure 10:
FIG. 10 is a front view of the splitter top hat.
Figure 9:
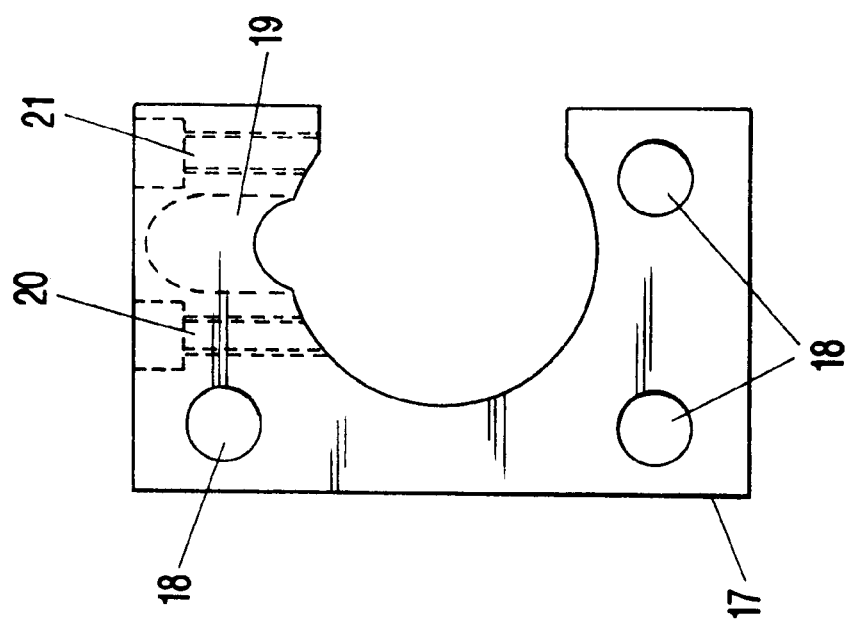
FIG. 9 is a top view of a splitter top hat.
Figure 13:
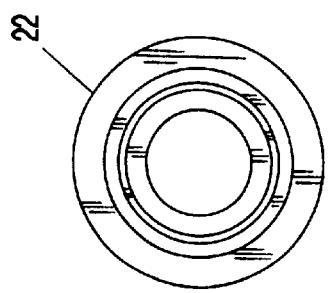
FIG. 13 is a bottom view of the LAFE.
Figure 12:
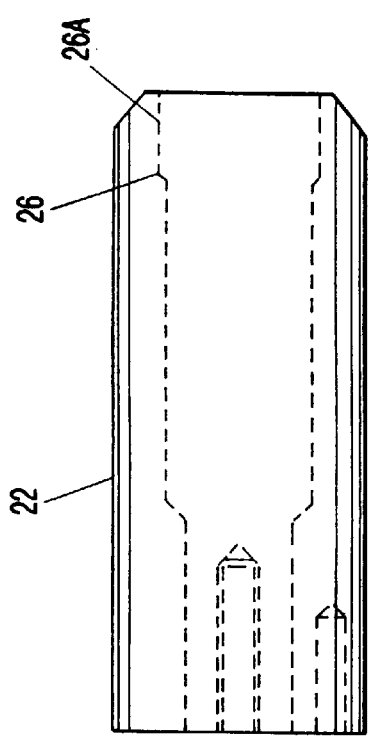
FIG. 12 is a side view of the LAFE.
Figure 11:
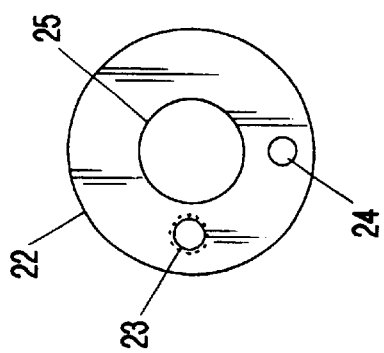
FIG. 11 is a top view of a Lens And Fiber End (LAFE)
Figure 15:
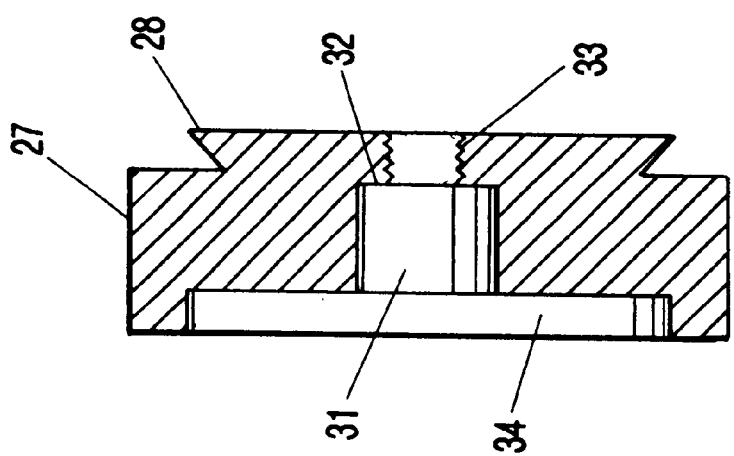
FIG. 15 is a sectional view of the splitter module.
Figure 14:
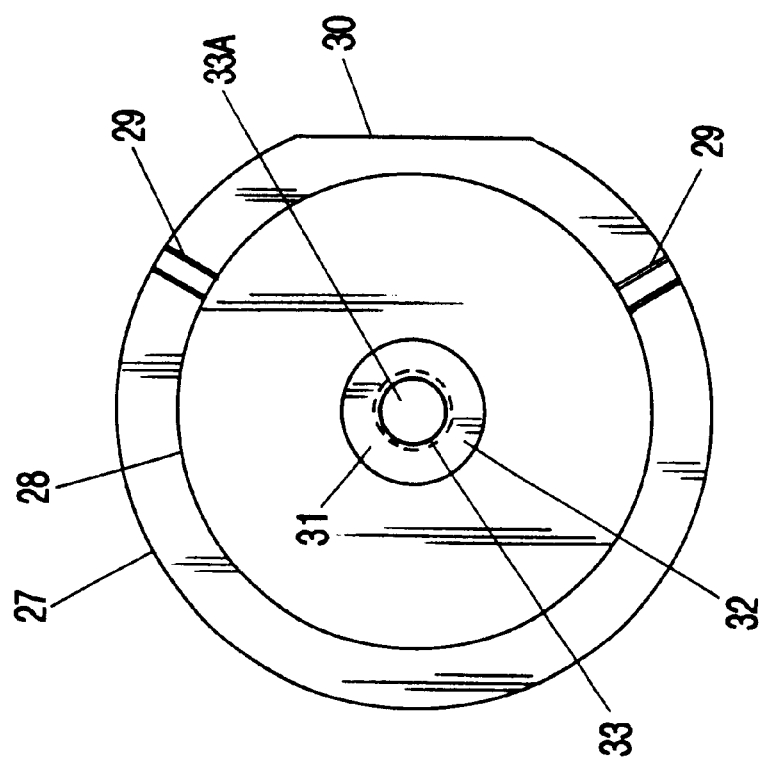
FIG. 14 is a front view of a splitter module.
Figure 17:
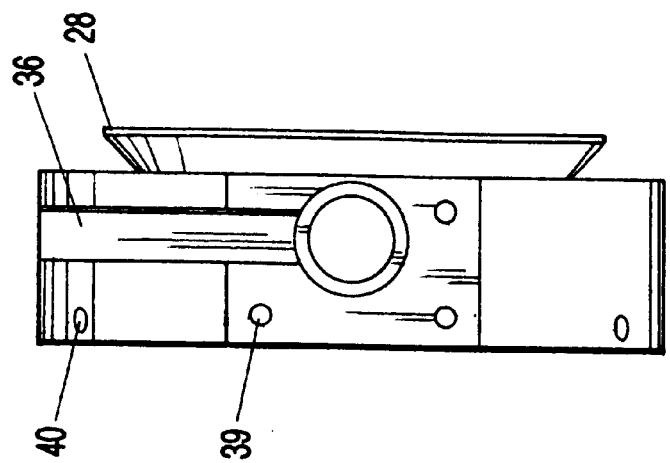
FIG. 17 is a top view of the splitter module.
Figure 16:
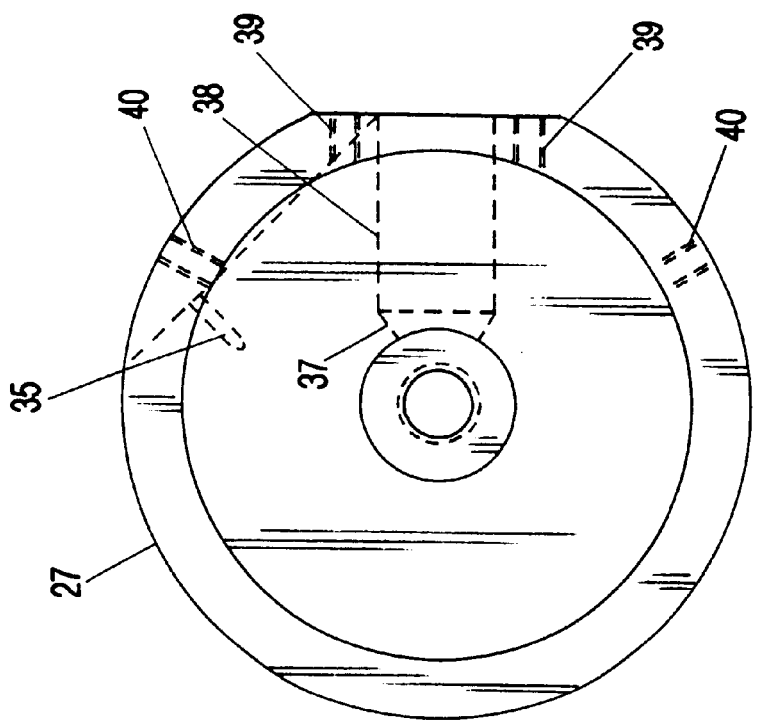
FIG. 16 is a front view of the splitter module with hidden lines.

Referring to FIGS. 11–14, part of the positioning mechanism comprises a cylinder in the radial hole called a LAFE 22, for Lens and Fiber End. The bottom 26A of the LAFE holds the focusing lens (not shown), and the top holds the fiber end. The top of the LAFE is positioned by two small screws 44 with fine threads 20,21 located in top hat 17 (see FIGS. 9–10) which additionally comprises top hat mounting holes 18 and spring clearance arch 19. Although the two screws are parallel to each other, one controls the X and the other the Y adjustment because their tips touch the LAFE at two points about 90° apart. A spring 43 holds the LAFE against the screw ends, and also keeps it seated in the LAFE-supporting cone 37. The Z adjustment to place the fiber end at the correct longitudinal position in the LAFE is preferably set at the factory, and so should not be changed. However, to adjust Z, set screw 46 in Z push screw hole 16 should be set to the same distance as the protrusion of the fiber from the fiber cable cap 11 plus a constant. Referring to FIGS. 7–8, the fiber cable cap comprises fiber jacket hole 12, fiber hole 13, spring pin clearance arc 14, Z pull screw hole 15, and Z push screw hole 16. Referring again to FIGS. 11–14, the LAFE additionally comprises Z pull screw threads 23, spring pin hole 24, fiber cable cap hole 25, and lens shelf 26.

A x100 attenuator (not shown), to be placed between the laser and the LABATOSA, is preferably provided with each AMBS to aid in reducing the light level during alignment procedures. Also, orienting the module for minimum splitting greatly reduces the light in the LAFE.

Several special tools are preferably supplied for use with the AMBS/FC, and include:

A x100 Neutral Density Filter for greatly decreasing the laser light level during installation and optimization of the AMBS, for laser safety.

A 1.27 mm (0.050") Hex Wrench with black handle for X-Y adjustments of the top of the LAFE. The wrench has a HexAid on its end, making it easy to engage the socket-head adjusting screws.

A sawed-off 3.57 mm (0.141") Hex Wrench for positioning the LABATOSA's dovetail piece.

A 2.39 mm (0.094") Ball Driver for 4-40 nylon screws that engage the dovetail.

A selection of hard plastic Shims of various thicknesses for use in optimizing the Pitch alignment of the LABATOSA.

A Yaw Bar with 8-32 set screws for use in optimizing the Yaw alignment of the LABATOSA.

A 1.98 mm (0.078") Hex Wrench for yaw set screws.

A ¼-28 Light Blocking Screw for the last module to prevent the escape of any un-split-off laser light.

The following procedure is preferred to install the invention assuming that the user has a Valyn International precision laser mount with a Coherent VISAR laser and a Newport fiber optic laser coupler installed on it. Valyn's precision laser mount comes with a slight depression for locating the fiber coupler in front of the laser. If the laser is a Coherent VERDI with at least 2 W output, a Valyn-provided adapter fastened in the precision laser mount depression raises the coupler to the laser beam height. Remove the fiber coupler, but leave any adapter in place. Also, a Valyn Laser Light Intensity Control (LLIC) has preferably been installed on the laser. Remove at least the outer rotating cup of the LLIC. The laser's own light intensity control and/or the x100 attenuator should be used to greatly decrease the light during installation and alignment of the AMBS.

Install the LABATOSA. An "L" shaped LAser BAse TO Splitter Adapter is provided to hold the first AMBS Module in place in the laser beam. Install the LABATOSA where the fiber optic laser coupler was formerly intended to be using the two supplied ¼-20 screws. Place the x100 attenuator in the laser light path between the laser and the LABATOSA. Place a light block to intercept the laser beam beyond the LABATOSA. Set the laser to come on at a minimum power. Take any other appropriate laser safety precautions before turning on the laser. Then turn on the laser. The position of the laser beam through the hole 2 in the dovetail of the LABATOSA can be seen by covering the hole with masking tape. It also helps to blacken the outside of the tape with a pen where the laser beam strikes it on the inside. The beam needs to be very well centered in the hole. Fortunately, oversize screw holes 6 allow for some adjustment of the position of the dovetail piece. Use the supplied sawed-off hex wrench to loosen four screws. While holding the dovetail piece to center the laser beam through it, tighten one of the screws. Then turn off the laser light, and tighten the rest of the screws.

Install the First Splitter Module. Carefully unpack one of the splitter modules with its output fiber attached. Remove any protective covers. Unscrew the two nylon screws until they no longer protrude through the flange. Then slip the flange over the dovetail on the LABATOSA, and tighten the two nylon screws just enough to hold the module snugly in place. One should now be able to rotate the Splitter Module smoothly without any looseness.

Align the First Splitter Module. Take laser safety precautions, such as having the x100 attenuator in place, laser on minimum power, etc. Block the light that will come through the hole in the splitter's dovetail. Finally, make sure the laser light that will come out of the end of the Splitter Module's output fiber will not present a danger. Turn on the laser.

Alignment Method. Place the output end of the Splitter Module's output fiber against a white piece of paper at an angle of about 45°. With the laser turned on, a little green laser light should be visible emerging from the fiber. If not, increase the split-off light by orienting the Module until some green light is visible on the paper. Next, locate the Module's two alignment screws, located in the Top Hat 17 of the Module. (The Top Hat is the piece held onto the flat on top 30 of the Module by three small socket head cap screws in holes 18 with threads 39.) Using the 0.050" Hex Wrench, with a HexAid on its end, adjust one of the alignment screws to roughly maximize the green light. Then adjust the other one to again roughly maximize the light. As the light gets brighter, decrease its intensity by orienting the Module to decrease the amount of light split off, or by moving the fiber end away from the white paper. Continue adjusting the alignment screws, each time maximizing the light. Very soon, the light level will suddenly increase a lot, indicating the light is entering the core of the output fiber. Adjust to a comfortable light brightness on the paper, which should now be an inch or more from the fiber end. Finally, adjust the alignment screws to attain the smallest spot size on the paper, indicating the light is focused on the center of the fiber core.

Fine Tune the LABATOSA Alignment. With the Splitter Module alignment optimized as described above, turn the module until its output fiber is about 5 to 10° from vertical. Realign by adjusting the X and Y screws. Then, while watching the alignment as indicated by the light emerging from the end of the output fiber, turn the module to the left and to the right. One will see the light go through a minimum as the module goes through vertical, because that is where the least light is reflected by the beamsplitter. However, superimposed on this effect, one will probably see another, namely, the farther you rotate from the optimized position, the more out of alignment the module becomes, until nearly all light is lost.

Since one adjusts the splitting of the AMBS by rotating the modules with respect to each other, it is a great advantage to achieve a state in which the alignment is not ruined by modest module rotations. Such a state is reached when the LABATOSA holds the Splitter Modules so that their longitudinal axis is exactly parallel to the incoming laser beam.

One achieves parallelism by fine-tuning the LABATOSA's pitch and yaw (using aeronautical terms). One should only have to do this once. If needed, the pitch is adjusted by placing one or more shims under one end of the LABATOSA base 8. The shims are preferably supplied with the AMBS. The yaw is controlled by two set screws through a metal "yaw bar" (not shown) which must be installed next to the LABATOSA base. Everything is provided except for two holes that must be drilled and tapped to hold the yaw bar in place.

Assuming the required holes have now been made, proceed to install the yaw bar. If the yaw bar is to be installed on the adapter under the LABATOSA, place washers between the adapter and the yaw bar to hold the latter slightly away from the LABATOSA base. The set screws in the yaw bar should not protrude through the yaw bar at this point.

Loosen the two ¼-20 screws that hold the LABATOSA in place, and retighten them while pressing the LABATOSA in the direction of the yaw bar. These screws can be actuated with a 3/16 inch ball driver without removing the first module from the LABATOSA.

At this point, orient the Splitter Module so that its output fiber is about 100 from the vertical. Take laser safety precautions as discussed above, and turn on the laser. Optimize the alignment as discussed above, achieving the smallest spot size possible from the output fiber. Then measure the "alignment angle," defined as follows. Turn the Splitter Module to the left until misalignment is essentially complete, i.e., to where the light from the output fiber first reaches a small, nearly steady value. Note the angular orientation of the module. Then turn the module to the right, through optimum alignment, and on until misalignment is again essentially complete. The angle from left misalignment to right misalignment is the alignment angle. It is a measure of the stability of the alignment as the module is rotated to adjust the light splitting ratio.

Alignment angles up to 180°, the approximate maximum possible rotation of a Splitter Module, can be measured. Alignment angles of 180° or more are considered excellent. Those with 90° or less are considered poor. Note: While measuring alignment angles, the spring-loaded LAFE can be accidentally rotated around its longitudinal axis by several degrees, which affects the alignment and confuses the measurement.

If the alignment angle of the first Splitter Module is not satisfactory, it can be improved by optimizing the pitch (the tilt in the vertical plane) of the LABATOSA. Several hard plastic shims are preferably supplied for this purpose, color coded according to their thickness. They can be installed under the LABATOSA on either side of its hold-down screws. Experiment to obtain the best alignment angle, being careful to always repeat the same yaw angle while optimizing the pitch.

The alignment angle may be further improved using the set screws in the yaw bar. One of the two set screws should always be withdrawn from contact with the LABATOSA base. The small amount of yaw allowed by the LABATOSA hold-down screw holes should be sufficient to optimize the yaw. When the beam centering, the pitch, and the yaw are all optimized, the alignment angle should be larger than the 180° through which the module can be rotated. The alignment of the LABATOSA provides alignment insensitivity not only to the first Splitter Module, but also to others attached behind it.

Completing the Installation. Subsequent Splitter Modules are installed the same as the first, by attaching to the last previous dovetail and aligning for minimum spot size. Once all modules are installed, each can be rotated with respect to the others to attain any desired splitting ratios without greatly disturbing the light alignment, due to optimizing the beam centering, pitch, and yaw of the LABATOSA.

The invention is preferably used as follows:

Twisting the LAFE. Not surprisingly, the output fiber cables can cause some twisting of the LAFE when they are moved. Also, since modules must be rotated to adjust their splitting ratios, their output cables will be moved, and some twisting with consequent alignment degradation may occur. If this should happen, simply grasp the fiber cable cap 11 (which is attached to the LAFE), and twist it a little to retrieve optimum alignment. This is easier than readjusting X and Y.

Changing the Number of Split-Off Outputs. Laser splitters of the prior art have a fixed number of outputs that cannot be adjusted. However, the AMBS/FC permits simply adding additional modules, since modules are fungible and interconnectable. If fewer outputs are desired, either detach the end module(s), or set any one or more of the modules to split off no light. This is nearly as efficient as detaching modules.

Exchanging Output Fibers. This may be necessary if an output fiber is damaged, or if a different output fiber length is required. Note that there are two 0-80 socket head cap screws through the fiber cable cap. One of the screws is farther from the dovetail than the other. Do not turn this screw, as it has preferably been set at the factory to hold the fiber tip at the correct Z position in the LAFE. To exchange an output fiber cable, remove the 0-80 screw that is closest to the dovetail. Then carefully lift the cap out of the top of the LAFE. Protect the fiber end protruding from the cable cap at all times. Reverse to install the new output fiber cable, being very careful of the bare fiber protruding from the fiber cable cap.

Attaining Even Splitting Ratios. The most common splitting ratio desired is even splitting, where the outputs are all equal. If one has a seven-beam splitter, for example, even splitting requires the first module to split off one-seventh of the light it receives from the laser, and to transmit six-sevenths of the light. The second module should split off one-sixth of the light it receives, and transmit five-sixths. The third should split off one-fifth of the light, etc., until the last module should split off all the light it receives.

For the following discussion, it is necessary to define the "lateral axis" of a Splitter Module. The longitudinal axis, of course, is the axis parallel to the beam of light coming into the module. The lateral axis is perpendicular to the longitudinal axis, and passes through the module center and the "top" of the module where the output fiber cable is attached. The module's beamsplitter directs the split-off light along its lateral axis.

The amount of light split off depends on the angle of the Splitter Module's lateral axis with respect to the polarization angle of the light entering the module. The angle of polarization of the light from most lasers is vertical. Therefore, if the first module in an AMBS has its lateral axis vertical, it splits off almost no light, but the split-off light increases rapidly as the lateral axis is tiled in either direction away from vertical. Each module transmits light that is polarized parallel to its lateral axis, so if two successive modules are oriented the same way, the downstream one will split off almost no light.

Whenever a splitter modules' lateral axis is perpendicular to the polarization of the incident light beam, essentially all the light is split off, and almost none is transmitted. This is the condition normally desired for the last module—it should gather all the remaining light into its output fiber so none will be wasted. Therefore, the last module should normally have its lateral axis perpendicular to that of the next-to-last module. Similarly, for even splitting, the next-to-last module should split off half of the incident light. This requires a 45° angle between its lateral axis and that of the third-from-last module. Modules further upstream require successively smaller angles for even splitting. Table I lists the angles required to attain various fractions of splitting.

TABLE 1

| Fraction of Light Split Off | 1/7 | 1/6 | 1/5 | 1/4 | 1/3 | 1/2 | 1/1 |
|---|---|---|---|---|---|---|---|
| Angle with Respect to Incident Polarization | 22.2° | 24.1° | 26.6° | 30.0° | 35.3° | 45.0° | 90.0° |

The above discussion neglects the effects of losses in the Splitter Modules, but the effect on the angles is minor. Much of the AMBS's~20% or less light loss occurs in the output fibers beyond the actual splitters.

Using Odd Splitting Ratios. When splitting laser light into several optical fiber light paths, one often needs uneven splitting to compensate for different light losses in the different paths, and differing light requirements at the destination of the light, etc. Murphy's Law will nearly always see to it that the weakest output from a nominally even fiber splitter will be assigned to the leg needing the most light. The AMBS/FC of the present invention solves this problem by allowing the user to easily adjust the amount of light assigned to any of the legs. This is done without light attenuation. When one output is receiving more light than is needed, the excess is easily diverted to other outputs, and needed light is taken from less needy outputs. Such tailoring of the output intensities is called odd splitting, as opposed to even splitting. The following are some points to remember about odd splitting.

When rotating a module to adjust its amount of split-off light, do not allow the upstream modules to rotate, but allow all the down-stream modules to rotate as a unit with the module being adjusted. When this is done, things are relatively simple. The upstream outputs are not affected, and the down stream outputs are all changed in reverse proportion to the change in light taken by the module being adjusted. For example, suppose we have a five-module AMBS, which is adjusted to put out 20% of the input beam into each output fiber—even splitting. Suppose also that we now need 30% instead of 20% in output #3. We hold modules 1 and 2 steady, and rotate 3, 4, and 5 together until the #'output is increased to the desired 30%. In so doing, outputs #1 and #2 remain constant at 20%, and the #4 and #5 outputs are decreased to 15% each. We have borrowed light from the downstream outputs to increase #3. If we decrease the light to #3, the excess is passed on to the downstream outputs.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An adjustable laser light beamsplitter and fiber optic coupler apparatus comprising a plurality of fungible splitter modules placeable into an optical path, each said module comprising;
   splitter means to split off an adjustably selectable portion of an incident polarized laser beam;
   fiber coupler means to capture said split-off portion into an optical fiber; and
   beam transmission means to transmit a remainder of said incident beam to serve as an incident polarized laser beam for any subsequent splitter module.

2. The apparatus of claim 1 wherein said splitter means comprises a polarizing beamsplitter.

3. The apparatus of claim 2 wherein said splitter means comprises means to allow rotation of said beamsplitter about an axis of the incident beam, thereby providing adjustability of the selectable portion of the incident laser beam via rotational orientation of said beamsplitter with respect to polarization of the incident laser beam.

4. The apparatus of claim 2 wherein said fiber coupler means comprises a light beam focusing means for focusing said split-off portion to a point of focus.

5. The apparatus of claim 4 wherein said fiber coupler means additionally comprises optical fiber positioning means.

6. The apparatus of claim 5 wherein said optical fiber positioning means comprises means for providing X, Y, and Z adjustability of an optical fiber end to substantially coincide with said point of focus.

7. The apparatus of claim 4 additionally comprising means for securing said light beam focusing means to said polarizing beamsplitter.

8. The apparatus of claim 2 wherein said polarizing beamsplitter comprises a dichroic cube polarizing beamsplitter.

9. The apparatus of claim 1 wherein each of said splitter modules comprises a disk housing said splitter, fiber coupler, and beam transmission means.

10. The apparatus of claim 9 wherein said splitter means directs said split-off portion in a direction perpendicular to the incident laser beam.

11. The apparatus of claim 1 additionally comprising means to support said splitter modules in an alignment plane and centered on the optical path.

12. The apparatus of claim 11 additionally comprising means to allow rotation of each said splitter module independently from rotation of adjacent splitter modules.

13. The apparatus of claim 1 wherein each said splitter module comprises module coupling means to couple to adjacent splitter modules.

14. The apparatus of claim 1 additionally comprising laser light containment means to prevent escape of laser light other than through optical fibers.

15. A laser light beamsplitting and fiber optic coupling method comprising the steps of:
   placing a plurality of fungible splitter modules into an optical path;
   adjusting each module to divert a desired amount of an incident polarized laser beam,
   directing a polarized laser beam along the optical path; and allowing each module to:
split off a selectable portion of an incident polarized laser beam;
capture the split-off portion into an optical fiber; and
transmit a remainder of the incident beam to serve as an incident polarized laser beam for any subsequent splitter module.

16. The method of claim 15 wherein the allowing step comprises allowing split off via a polarizing beamsplitter.

17. The method of claim 16 wherein the adjusting step comprises rotating the beamsplitter about an axis of the incident beam, thereby providing adjustability of the selectable portion of the incident laser beam via rotational orientation of the beamsplitter with respect to polarization of the incident laser beam.

18. The method of claim 16 wherein the allowing step comprises capture via fiber coupler means comprising a light beam focusing means for focusing the split-off portion to a point of focus.

19. The method of claim 18 wherein in the allowing step the fiber coupler means additionally comprises optical fiber positioning means.

20. The method of claim 19 wherein in the allowing step the optical fiber positioning means comprises means for providing X, Y, and Z adjustability of an optical fiber end to substantially coincide with the point of focus.

21. The method of claim 18 wherein in the placing step each module comprises means for securing the light beam focusing means to the polarizing beamsplitter.

22. The method of claim 18 wherein in the allowing step the polarizing beamsplitter comprises a dichroic cube polarizing beamsplitter.

23. The method of claim 15 wherein in the placing step each of the splitter modules comprises a disk housing the splitter, fiber coupler, and beam transmission means.

24. The method of claim 23 wherein in the allowing step the split-off portion is directed in a direction perpendicular to the incident laser beam.

25. The method of claim 15 additionally comprising the step of supporting the splitter modules in an alignment plane and centered on the optical path.

26. The method of claim 25 wherein in the adjusting step rotation of each splitter module is independent from rotation of adjacent splitter modules.

27. The method of claim 15 wherein in the placing step each of the splitter modules comprises module coupling means to couple to adjacent splitter modules.

28. The method of claim 15 additionally comprising the step of placing laser light containment means to prevent escape of laser light other than through optical fibers.

* * * * *